(12) United States Patent
Yarabolu

(10) Patent No.: US 11,790,093 B2
(45) Date of Patent: Oct. 17, 2023

(54) COGNITIVE TOKENS FOR AUTHORIZING RESTRICTED ACCESS FOR CYBER FORENSICS

(71) Applicant: BANK OF AMERICA CORPORATION, Charlotte, NC (US)

(72) Inventor: Vijay Kumar Yarabolu, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 419 days.

(21) Appl. No.: 17/243,999

(22) Filed: Apr. 29, 2021

(65) Prior Publication Data
US 2022/0350899 A1    Nov. 3, 2022

(51) Int. Cl.
| G06N 5/04 | (2023.01) |
| G06F 21/60 | (2013.01) |
| G06F 21/62 | (2013.01) |
| G06N 5/043 | (2023.01) |
| G06Q 30/018 | (2023.01) |
| G06Q 10/10 | (2023.01) |

(52) U.S. Cl.
CPC ........ *G06F 21/604* (2013.01); *G06F 21/6218* (2013.01); *G06F 21/6227* (2013.01); *G06N 5/043* (2013.01); *G06Q 30/018* (2013.01); *G06F 2221/2137* (2013.01); *G06F 2221/2141* (2013.01); *G06Q 10/103* (2013.01)

(58) Field of Classification Search
CPC ............... G06F 21/604; G06F 21/6218; G06F 21/6227; G06F 2221/2137; G06F 2221/2141; G06N 5/043; G06N 5/04; G06Q 30/018; G06Q 10/103

See application file for complete search history.

(56) References Cited

U.S. PATENT DOCUMENTS

| 9,213,687 B2 | 12/2015 | Au |
| 9,473,522 B1 | 10/2016 | Kotler et al. |
| 9,781,099 B1 | 10/2017 | Brinskelle |
| 9,860,208 B1 | 1/2018 | Ettema et al. |
| 9,996,695 B2 | 6/2018 | Liu et al. |

(Continued)

*Primary Examiner* — Joseph P Hirl
*Assistant Examiner* — Aayush Aryal
(74) *Attorney, Agent, or Firm* — Moore & Van Allen PLLC; James C. Edwards

(57) ABSTRACT

Restricted access tokens are cognitively generated that provide cyber forensic specialists restricted access to applications that require investigation. Cognitive analysis is performed on case details and, in some instances, evidence logs of previously investigated applications to determine parties involved in the investigation and applications requiring investigation. In response to identifying one of the applications, the case details, applicable evidence logs and the identified application are cognitively analyzed to determine operations that are required to be performed in the application and a time required to perform the operations. A restricted access token is generated that is specific to the assigned specialist, the case, and the application. The restricted access token grants the assigned specialist access to only data in the application associated with the one or more parties, rights to perform only the one or more operations in the application, and access to the initial application for a usage time that is based on the time required to perform the operations.

20 Claims, 7 Drawing Sheets

(56) References Cited

U.S. PATENT DOCUMENTS

| | | | |
|---|---|---|---|
| 10,015,198 B2 | 7/2018 | Ettema et al. | |
| 10,097,578 B2 | 10/2018 | Baldonado et al. | |
| 10,360,301 B2 | 7/2019 | Allen et al. | |
| 10,404,661 B2 | 9/2019 | Ettema et al. | |
| 10,594,736 B1 | 3/2020 | Amit et al. | |
| 10,742,658 B2 | 8/2020 | Lelcuk et al. | |
| 10,902,058 B2 | 1/2021 | Tcherechansky et al. | |
| 10,992,704 B2 | 4/2021 | Ettema et al. | |
| 11,012,415 B2 | 5/2021 | Moore | |
| 11,032,294 B2 | 6/2021 | Joshi et al. | |
| 11,043,307 B2 | 6/2021 | Smurro | |
| 11,095,612 B1 | 8/2021 | Oswal et al. | |
| 11,449,619 B2 | 9/2022 | Kotler et al. | |
| 2018/0367549 A1* | 12/2018 | Jang | G06N 5/022 |
| 2019/0073885 A1* | 3/2019 | Bess | H04L 63/302 |
| 2019/0108717 A1* | 4/2019 | Arnone | G07F 17/3244 |
| 2019/0109717 A1 | 4/2019 | Reddy et al. | |
| 2019/0334950 A1* | 10/2019 | Ylonen | H04L 63/1483 |
| 2021/0256123 A1* | 8/2021 | Linga | G06F 21/6227 |

* cited by examiner

COGNITIVE TOKENS FOR AUTHORIZING RESTRICTED ACCESS FOR CYBER FORENSICS

FIELD OF THE INVENTION

The present invention is generally directed to cyber forensic investigation and data security, more specifically, cognitively determining information about a cyber forensic case and an application or system requiring access during the investigation to create restricted access tokens that are specific to a specialist, a case and provide for limited access to only the data features and operations necessary to perform the investigation.

BACKGROUND

Cyber forensics, otherwise referred to as computer forensics, is the application of investigation and analysis techniques for purpose of gather and preserving evidence from particular computing device in a manner that is suitable for evidentiary presentation in courts of law. A cyber forensic specialist performs a structured investigation while maintaining a documented chain of evidence to ascertain exactly how the event occurred and who is responsible. In the context of financial institutions, cyber forensics is used to investigate actual or potential wrongdoer, which has or may have resulted in misappropriation of funds or the like.

In order to conduct such investigations, the cyber forensic specialist requires access to many different computer applications/systems or the like. However, in certain instances, granting comprehensive, all-inclusive access to all of the applications within an enterprise results in security violations, since the applications may contain information of a secure nature (i.e., confidential data, private data, non-public information, or the like). In the event that a specialist is not granted access to application that is deemed essential to the investigation, essential data my be missing from the investigation, such that, the specialist is unable to determine how the event occurred and/or responsible parties. Moreover, if the essential data is captured by application owners (i.e., those who have authorized access to the application/system), the data may be viewed as comprised because there is no assurance of its originality and the manner by which it was obtain may not adhere to evidentiary procedures.

Therefore, a need exists to be able to determine proper application/system access requirements for cyber forensic purposes on a case-by-case basis. The desired systems, methods and like should provide for cognitive analysis to determine exactly what applications/systems and features and/or data therein requires accessing, along with operations that the specialist needs to perform within the applications/systems.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by cognitively determining information about a cyber forensic case and an application/system requiring access during the investigation to create restricted access token. The restricted access token is specific to the application/system, a specialist, and the case and provides for limited access to only the data, features, and operations necessary to perform the investigation. Moreover, the cognitive analysis determines the time required to perform the operations within the application/system and configures the restricted access token a period use limitation based on the time required to perform the operations. As such, embodiments of the present invention insures that the cyber forensic investigation occurs in a manner in which the specialist only has access to application/systems necessary to perform the investigation and is limited to accessing only data and features within those applications/system and performing only those operations required by the investigation.

In specific embodiments of the invention, the details of an identified cyber forensic case are cognitively analyzed to determine parties involved in the investigation and the computing applications/systems applicable to the investigation (i.e., the computer applications/systems that will need to be accessible to the cyber forensic specialist in order to conduct the investigation). Once the applications/systems have been determined, at initial application/system is identified, which serves as the entry point for the investigation. Further cognitive analysis is performed on the details of the cyber forensic and the initial application/system to determine operations that are required to be performed within the initial application/system and, where applicable, the features/sections of the application/system that need to be accessed to perform the identified operations. In addition, cognitive analysis is performed to determine the time required to perform the operations within the application.

Once the cognitive analysis is completed, a restricted access token is generated, and stored in a token database/table, which is specific to the cyber forensic specialist, the case, and the application. The token is configured, such that the cyber forensic specialist, is only granted access to specific data (e.g., specific data associated with parties involved in the investigation) and has rights to perform only certain operations within the application/system. In specific embodiments of the invention, the token is further configured to grant the cyber forensic specialist access to specific features/portions of the application/system in which the operations are to be performed. Moreover, the token is configured to have a predetermined usage period which is based on the determined time required to perform the operations within the application.

Once the initial application/system that has been investigated, iterative processing ensues whereby the details of the case and the evidence logs from previously analyzed applications/systems involved in the case are cognitively analyzed to determine any additional parties involved in the investigation and any additional computing applications/systems applicable to the investigation. In response, a next/subsequent application/system is identified, which serves as the next-in-time point for the investigation. Further cognitive analysis is performed on the details of the cyber forensic, previous evidence logs and the initial application/system to determine operations that are required to be performed within the next/subsequent application/system and, where applicable, the features/sections of the next/subsequent application/system that need to be accessed to perform the identified operations. In addition, cognitive analysis is performed to determine the time required to perform the operations within the next/subsequent application.

In addition, inventive concepts are described which are related to the access authorization process. The cyber forensic specialist, in possession of the token, will present the token, their specialist identifier and the case identifier to request access to the application/system. In response, the details of the token are retrieved and analyzed to determine whether the token has expired and whether the token has remaining usage time. In response to determining that the token has not expired and has remaining usage time, data required to be accessed within the application is identified and a temporary table is generated and populated with the identified data. In this regard, the cyber forensic specialist is granted access to the temporary table as opposed to the entirety of the database.

A system for managing cognitive restricted access tokens defined first for cyber forensic investigation defines first embodiments of the invention. The system includes a cyber forensic case requiring investigation by an assigned cyber forensic specialist. The cyber forensic case includes data pertaining to the cyber forensic case.

Additionally, the system includes a first computing apparatus having a first memory and one or more first computing processor devices in communication with the first memory. The first memory stores (i) a cognitive analysis platform, and (ii) an access token generator platform that are executable by the one or more first computing processing devices.

The cognitive analysis platform is configured to cognitively analyze the data pertaining to the cyber forensic case to determine (i) one or more parties associated with the cyber forensic case, and (ii) one or more computing applications required to be accessed to perform the investigation. In response to identifying an initial computing application from amongst the one or more computing applications, which defines an entry point for beginning the investigation, cognitively analyze the data pertaining to the cyber forensic case and the initial computing application to determine (i) one or more operations required to be performed within the initial computing application during the investigation, and (ii) a time required to perform the one or more operations.

The access token generator platform is configured to receive (i) a case identifier associated with the cyber forensic case, (ii) a user identifier associated with the assigned cyber forensic specialist, (iii) the one or more operations need to be performed during the investigation, and (iv) the time required to perform the one or more operations. In response to receiving (i)-(iv), the access token generator platform is configured to generate, and store in a token database, a restricted access token that is specific to (i) the assigned cyber forensic specialist, (ii) the cyber forensic case, and (iii) the initial computing application. The restricted access token grants the assigned cyber forensic specialist (a) access to only data in the initial computing application associated with the one or more parties, (b) rights to perform only the one or more operations in the initial computing application, and (c) access to the initial computing application for a first usage time that is based on the time required to perform the operations.

In specific embodiments of the system, the access token generator platform is further configured to generate the restricted access token that further grants the assigned cyber forensic specialist (d) access to only those features within the initial computing application that are associated with the one or more operations. In related embodiments of the system, the access token generator platform is further configured to generate the restricted access token that further grants the assigned cyber forensic specialist (e) access to each of the features for a corresponding second usage time. The second usage time is based on the time required to perform one or more associated operations within the corresponding feature.

In other specific embodiments of the system, the access token generator platform is further configured to generate the restricted access token that further grants the assigned cyber forensic specialist (d) access to the initial computing application until an occurrence of an expiration date.

In additional specific embodiments of the system, the cognitive analysis platform is further configured to, in response to completing investigation within the initial computing application or any subsequent computing application, cognitively analyze the data pertaining to the cyber forensic case and evidence logs associated with previously investigated computing applications to determine whether at least one of (i) one or more additional parties are associated with the cyber forensic case, or (ii) one or more additional computing applications need to be accessed to perform the investigation. In related embodiments of the system, the cognitive analysis platform is further configured to, in response to identifying a next computing application for forensic investigation from amongst (i) the one or more computing applications, or (ii) the one or more computing applications and the one or more additional computing applications, cognitively analyze the data pertaining to the cyber forensic case, the evidence logs associated with previously investigated computing applications, and the next computing application to determine (i) one or more operations required to be performed within the next computing application during the investigation, and (ii) a time required to perform the one or more operations. In further related embodiments of the system, the access token generator platform is further configured to generate a subsequent restricted access token that is specific to (i) the assigned cyber forensic specialist, (ii) the cyber forensic case, and (iii) the next computing application. The subsequent restricted access token grants the assigned cyber forensic specialist (a) access to only data in the next computing application associated with the one or more parties, or the one or more parties and the one or more additional parties, (b) rights to perform only the one or more operations in the next computing application, and (c) access to the next computing application for a first usage time that is based on the time required to perform the operations.

Moreover, in additional specific embodiments the system additionally includes a second computing apparatus having a second memory and one or more second computing processor devices in communication with the second memory. The second memory stores an application access authorization platform that is executable by the one or more second computing processing devices and configured to receive user input of the restricted access token, user identifier and a cyber forensic case identifier at the initial application, and access the token database to retrieve details of the restricted access token. The platform is further configured to determine, from the details, whether access can be provided to the user based on the usage time, and, in response to determining that access can be provided based on the usage time remaining, identify the data in the initial computing application associated with the one or more parties. Moreover, the platform is configured to generate a temporary table in the database that contains only the data in the initial computing application associated with the one or more parties, and grant the user access to only the temporary table to perform the one or more operations on the data in the temporary table. In additional related embodiments of the system, the application access authorization platform is further configured to delete the temporary table in response to the user exiting the initial application. In still further related embodiments of the system, the application access authorization platform is further configured to determine whether access can be provided to the user based on an expiration date assigned to the restricted access token, and identify the data in response to determining that access can be provided based on (i) the usage time remaining, and the (ii) the expiration date having not occurred.

A computer-implemented method for managing cognitive restricted access tokens for cyber forensic investigation defines second embodiments of the invention. The method is executed by one or more computing processor device. The method includes cognitively analyzing data pertaining to a cyber forensic case to determine (i) one or more parties associated with the cyber forensic case, and (ii) one or more computing applications required to be accessed to perform the investigation. The method further includes, in response to identifying an initial computing application from amongst the one or more computing applications, that defines an entry point for beginning the investigation, cognitively analyzing the data pertaining to the cyber forensic case and the initial computing application to determine (i) one or more operations required to be performed within the initial computing application during the investigation, and (ii) a time required to perform the one or more operations. Further, the method includes generating, and storing in a token database, a restricted access token that is specific to (i) the assigned cyber forensic specialist, (ii) the cyber forensic case, and (iii) the initial computing application. The restricted access token grants the assigned cyber forensic specialist (a) access to only data in the initial computing application associated with the one or more parties, (b) rights to perform only the one or more operations in the initial computing application, and (c) access to the initial computing application for a first usage time that is based on the time required to perform the operations.

In specific embodiments of the computer-implemented method, generating the restricted access token further comprising generating the restricted access token that further grants the assigned cyber forensic specialist (d) access to only those features within the initial computing application that are associated with the one or more operations.

In other specific embodiments of the computer-implemented method, generating the restricted access token further comprising generating the restricted access token that further grants the assigned cyber forensic specialist (d) access to the initial computing application until an occurrence of an expiration date.

In further specific embodiments the computer-implemented method further includes, in response to completing investigation within the initial computing application, cognitively analyzing the data pertaining to the cyber forensic case and evidence logs associated with previously investigated initial computing application to determine whether at least one of (i) one or more additional parties are associated with the cyber forensic case, or (ii) one or more additional computing applications need to be accessed to perform the investigation. The method further includes, in response to identifying a next computing application for forensic investigation from amongst (i) the one or more computing applications, or (ii) the one or more computing applications and the one or more additional computing applications, cognitively analyzing the data pertaining to the cyber forensic case, the evidence logs associated with previously investigated initial computing application, and the next computing application to determine (i) one or more operations required to be performed within the next computing application during the investigation, and (ii) a time required to perform the one or more operations. Moreover, the method includes generating a subsequent restricted access token that is specific to (i) the assigned cyber forensic specialist, (ii) the cyber forensic case, and (iii) the next computing application. The subsequent restricted access token grants the assigned cyber forensic specialist (a) access to only data in the next computing application associated with the one or more parties, or the one or more parties and the one or more additional parties, (b) rights to perform only the one or more operations in the next computing application, and (c) access to the next computing application for a first usage time that is based on the time required to perform the operations.

In additional specific embodiments the computer-implemented method further includes receiving a user input requesting access to the initial computing application and includes the restricted access token, a user identifier, and a cyber forensic case identifier. The method further includes accessing the token database to retrieve details of the restricted access token and determining, from the details, whether access can be provided to the user based on the usage time. In response to determining that access can be provided based on the usage time remaining, the method further includes identifying the data in the initial computing application associated with the one or more parties. In addition, the method includes generating a temporary table in the database that contains only the data in the initial computing application associated with the one or more parties, and granting the user access to only the temporary table to perform the one or more operations on the data in the temporary table.

A computer program product including a non-transitory computer-readable medium defines third embodiments of the invention. The computer-readable medium includes a first set of codes for causing a computer to cognitively analyze data pertaining to a cyber forensic case to determine (i) one or more parties associated with the cyber forensic case, and (ii) one or more computing applications required to be accessed to perform the investigation. Additionally, the computer-readable medium includes a second set of codes for causing a computer to, in response to identifying an initial computing application from amongst the one or more computing applications that defines an entry point for beginning the investigation, cognitively analyze the data pertaining to the cyber forensic case and the initial computing application to determine (i) one or more operations required to be performed within the initial computing application during the investigation, and (ii) a time required to perform the one or more operations. Further, the computer-readable medium includes a third set of codes for causing a computer to generate, and store in a token database, a restricted access token that is specific to (i) the assigned cyber forensic specialist, (ii) the cyber forensic case, and (iii) the initial computing application. The restricted access token grants the assigned cyber forensic specialist (a) access to only data in the initial computing application associated with the one or more parties, (b) rights to perform only the one or more operations in the initial computing application, and (c) access to the initial computing application for a first usage time that is based on the time required to perform the operations.

In specific embodiments of the computer program product, the third set of codes are further configured to cause the computer to generate the restricted access token that further grants the assigned cyber forensic specialist (d) access to only those features within the initial computing application that are associated with the one or more operations. In other specific embodiments of the computer program product, the third set of codes are further configured to cause the computer to generate the restricted access token that further grants the assigned cyber forensic specialist (d) access to the initial computing application until an occurrence of an expiration date.

In still further specific embodiments of the computer program product, the first set of codes are further configured to cause the computer to, in response to completing investigation within the initial computing application, cognitively analyze the data pertaining to the cyber forensic case and evidence logs associated with previously investigated initial computing application to determine whether at least one of (i) one or more additional parties are associated with the cyber forensic case, or (ii) one or more additional computing applications need to be accessed to perform the investigation. In such embodiments, the second set of codes are further configured to cause the computer to, in response to identifying a next computing application from amongst (i) the one or more computing applications, or (ii) the one or more computing applications and the one or more additional computing applications, cognitively analyze the data pertaining to the cyber forensic case, the evidence logs associated with previously investigated initial computing application, and the next computing application to determine (i) one or more operations required to be performed within the next computing application during the investigation, and (ii) a time required to perform the one or more operations. In such embodiments, the third set of codes are further configured to cause the computer to generate a subsequent restricted access token that is specific to (i) the assigned cyber forensic specialist, (ii) the cyber forensic case, and (iii) the next computing application. The subsequent restricted access token grants the assigned cyber forensic specialist (a) access to only data in the next computing application associated with the one or more parties, or the one or more parties and the one or more additional parties, (b) rights to perform only the one or more operations in the next computing application, and (c) access to the next computing application for a first usage time that is based on the time required to perform the operations.

Moreover, in additional embodiments of the computer program product, the computer-readable medium further includes a fourth set of codes for causing a computer to (i) receive user input requesting access to the initial computing application and includes the restricted access token, a user identifier and a cyber forensic case identifier and (ii) access the token database to retrieve details of the restricted access token. In addition the computer-readable medium includes a fifth set of codes for causing a computer to determine, based on the details, whether access can be provided to the user based on the usage time, and, in response to determining that access can be provided based on the usage time remaining, identify the data in the initial computing application associated with the one or more parties. Additionally, the computer-readable medium includes a sixth set of codes for causing a computer to generate a temporary table in the database that contains only the data in the initial computing application associated with the one or more parties, and grant the user access to only the temporary table to perform the one or more operations on the data in the temporary table.

Thus, according to embodiments of the invention, which will be discussed in greater detail below, the present invention provides for restricted access tokens that are cognitively generated and provide cyber forensic specialists restricted access to computing applications that require investigation. Cognitive analysis is performed on case details and, in some instances, evidence logs of previously investigated computing applications to determine parties involved in the investigation and computing applications requiring investigation. In response to identifying one of the computing applications, the case details, applicable evidence logs and the identified computing application are cognitively analyzed to determine operations that are required to be performed in the application and a time required to perform the operations. A restricted access token is generated that is specific to the assigned specialist, the case, and the computing application. The restricted access token grants the assigned specialist access to only data in the application associated with the one or more parties, rights to perform only the one or more operations in the computing application, and access to the initial application for a usage time that is based on the time required to perform the operations.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
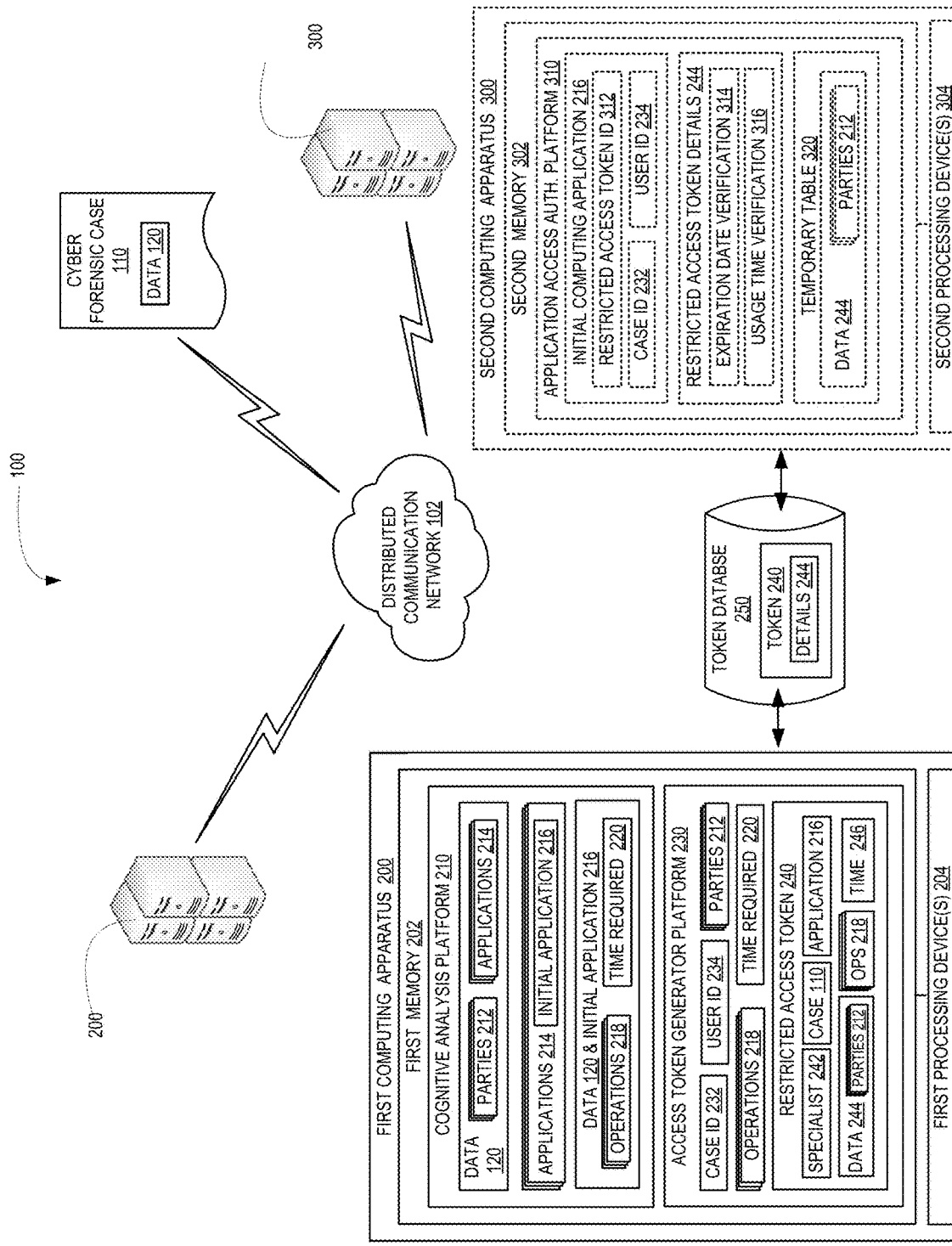
Figure 2:
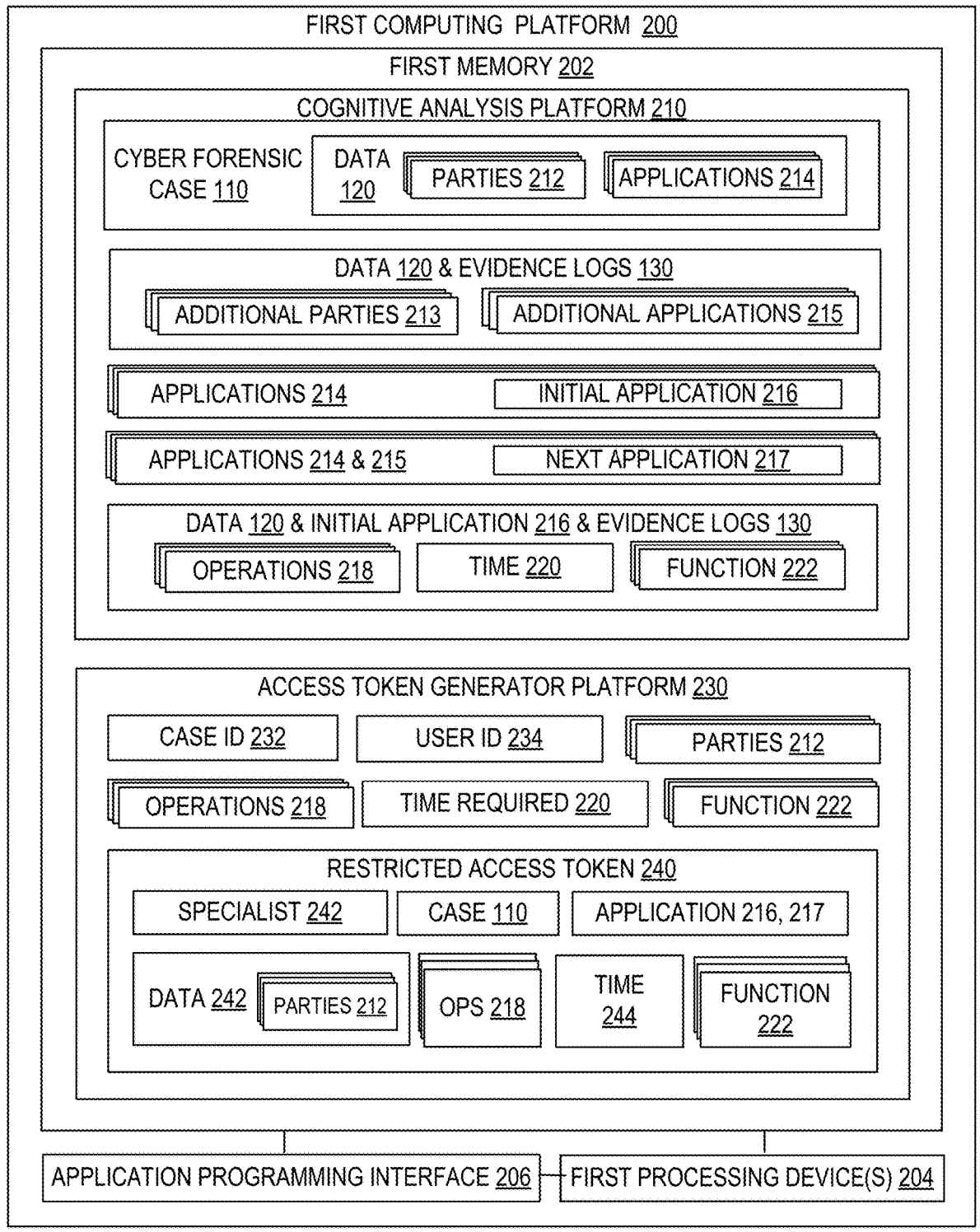
Figure 3:
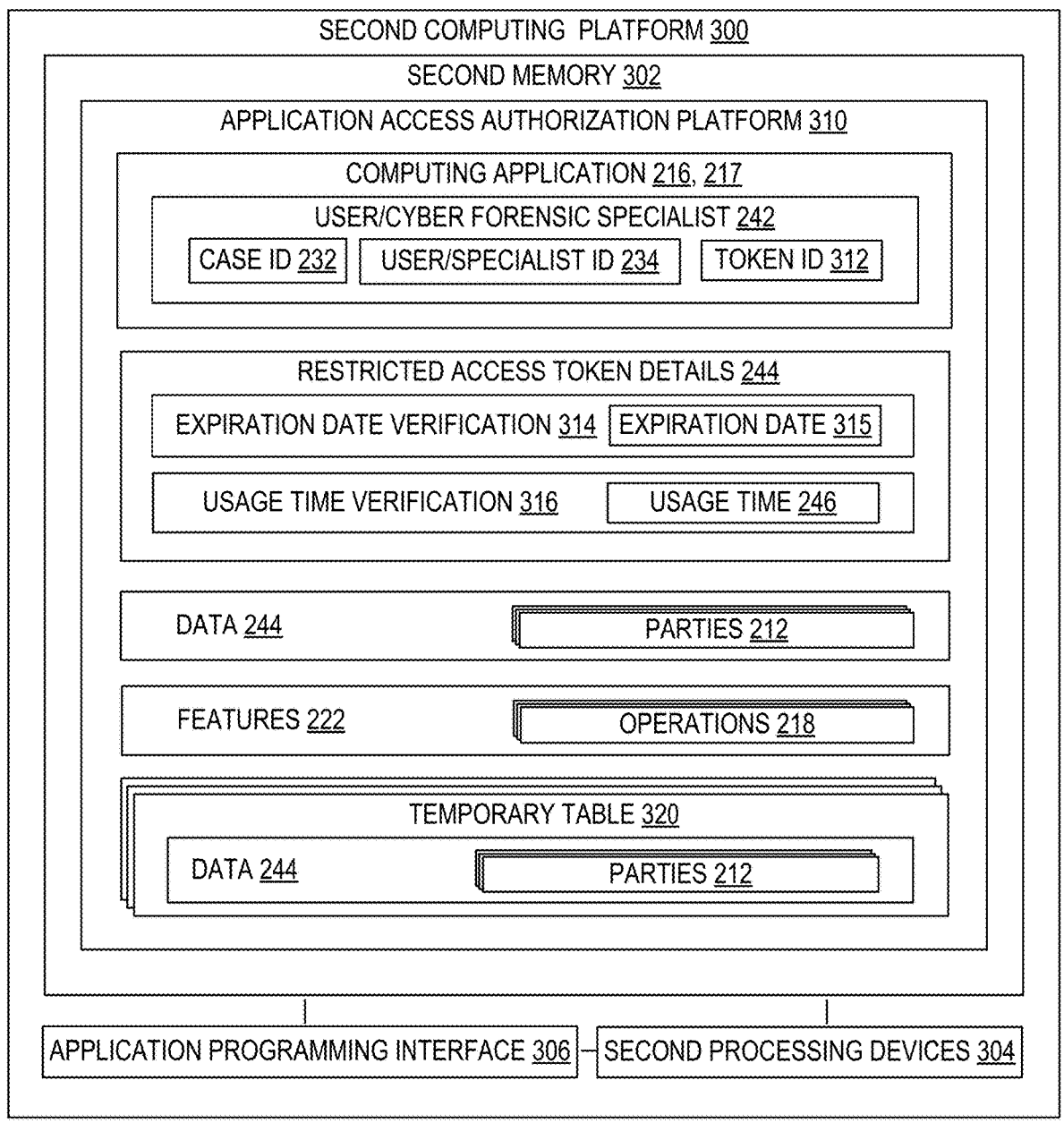
Figure 4:
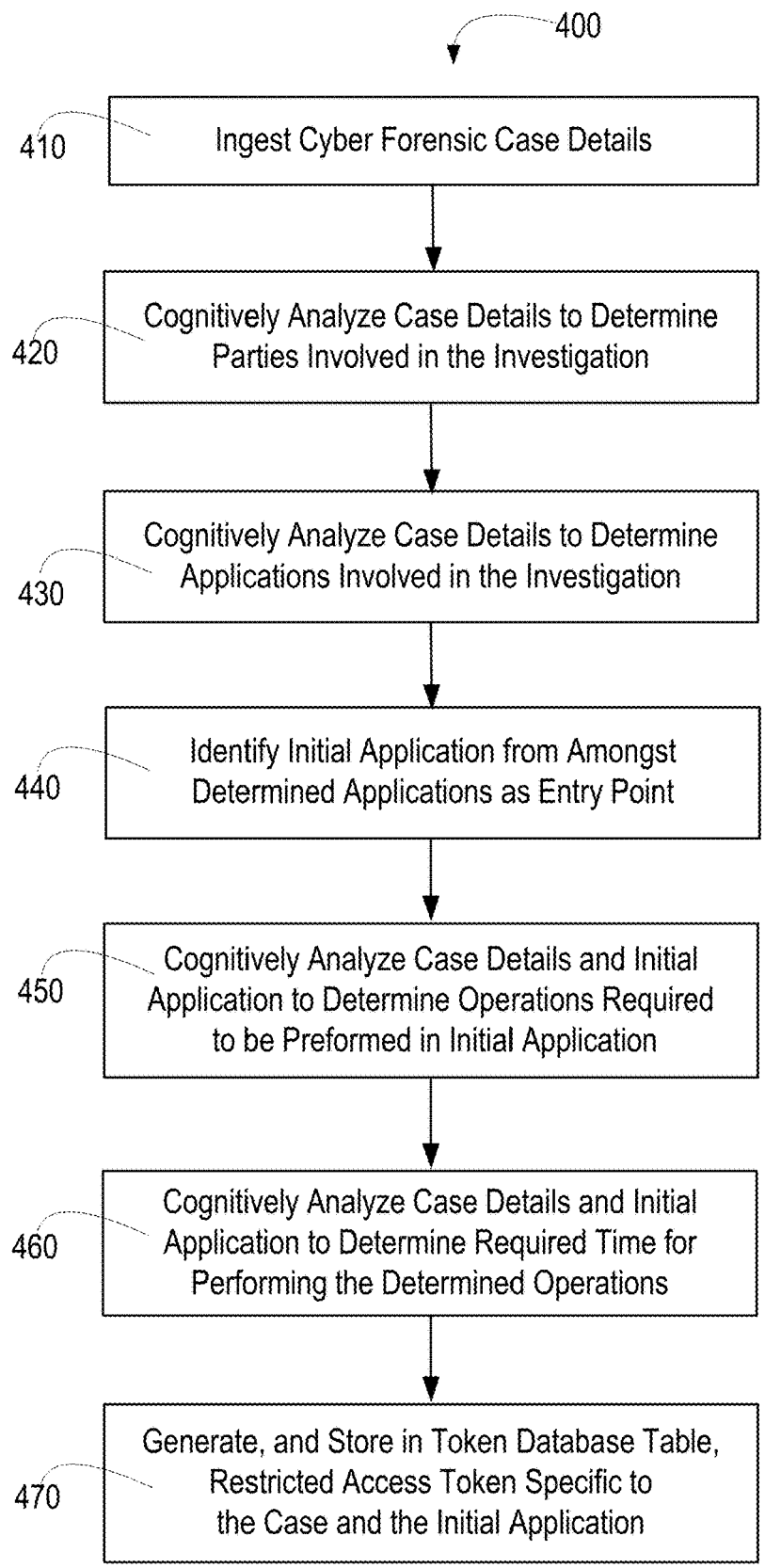
Figure 5:
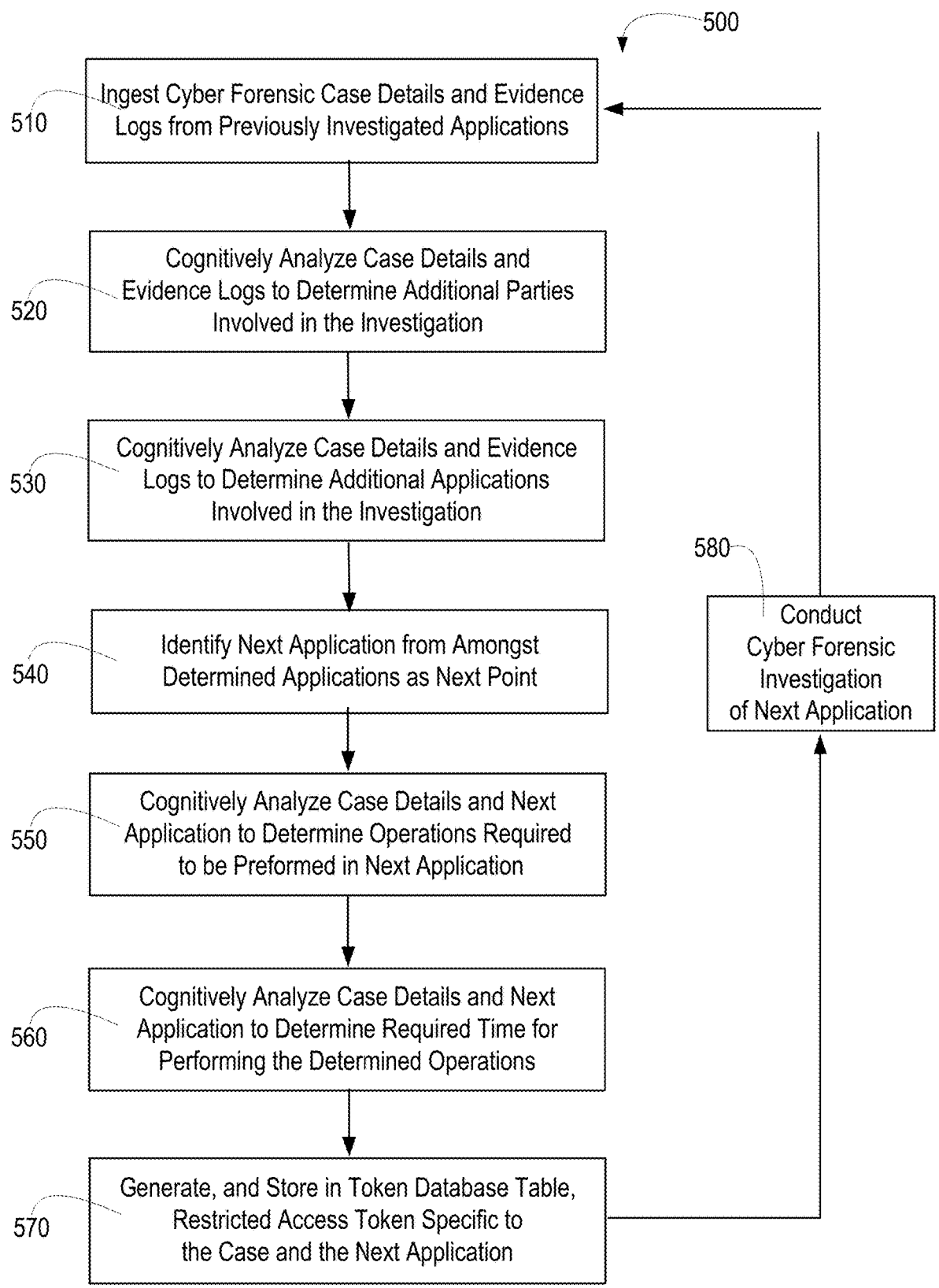
Figure 6:
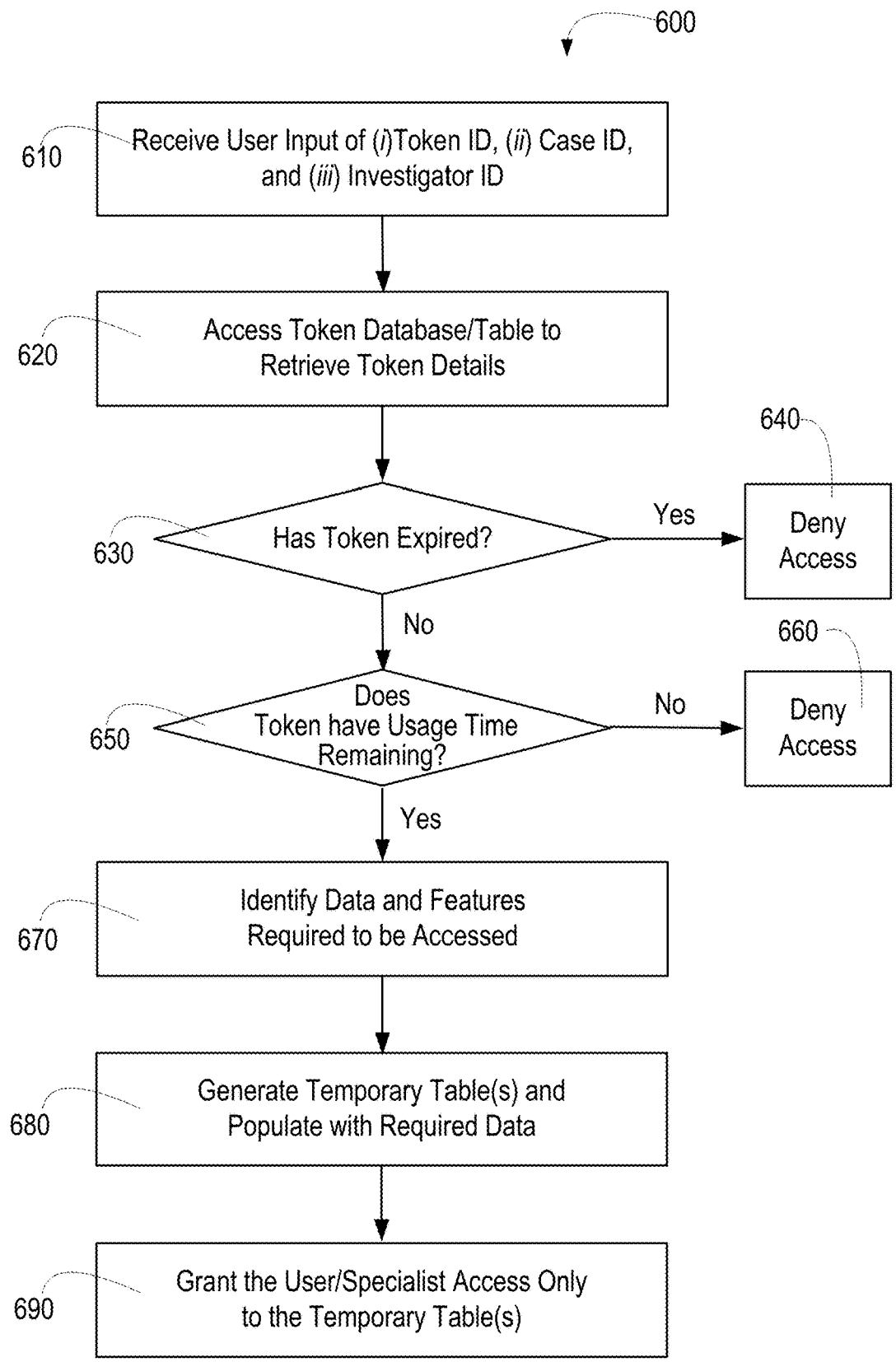
Figure 7:
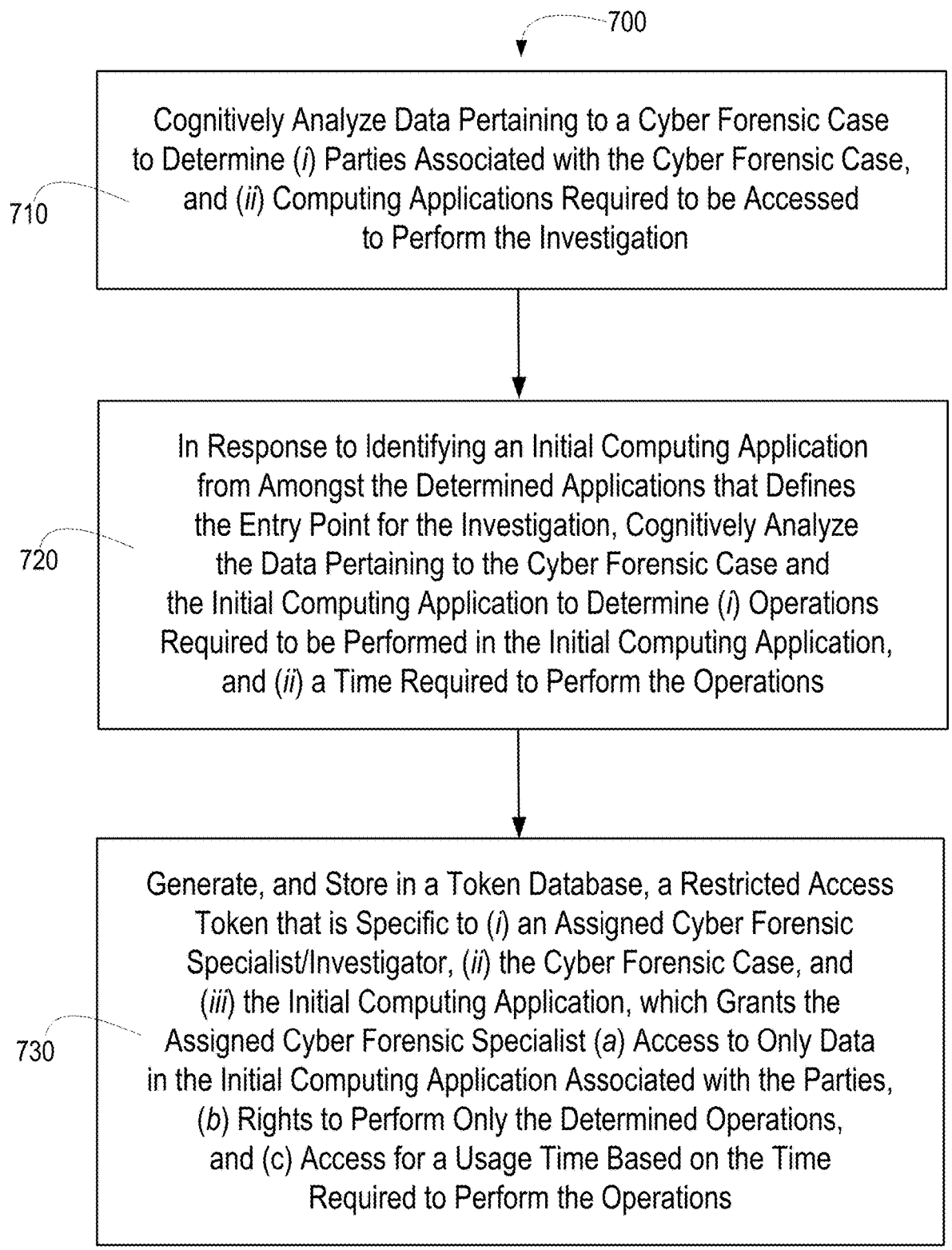

Having thus described embodiments of the disclosure in general terms, reference will now be made to the accompanying drawings, wherein:

FIG. 1 is a schematic/block diagram of a system for generating and managing cognitive restricted access tokens for cyber forensic investigations, in accordance with embodiments of the present invention;

FIG. 2 is a block diagram of a computing apparatus including a cognitive analysis platform and an access token generator platform, in accordance with embodiments of the present invention;

FIG. 3 is a block diagram of a computing apparatus including an application access authorization platform, in accordance with embodiments of the present invention;

FIG. 4 is a flow diagram of a method for cognitive analysis of a cyber forensic case and an initial application and generation of a restricted access token, in accordance with embodiments of the present invention;

FIG. 5 is a flow diagram of an iterative method for cognitive analysis of a cyber forensic case, previous application evidence logs and a next application and generation of a subsequent restricted access token, in accordance with embodiments of the present invention;

FIG. 6 is a flow diagram of a method for accessing an application for cyber forensic investigation using a restricted access token, in accordance with embodiments of the present invention; and FIG. 7 is a flow diagram of a method for cognitive analysis of a cyber forensic case and an initial application and generation of a restricted access token, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below that provide for cognitively determining parties and applications pertaining to cyber forensic case and operations pertaining to the investigation and a time required to perform the operations to subsequently generate a restricted access token. The restricted access token is specific to the application/system, a specialist, and the case and provides for limited access to only the data, features, and operations necessary to perform the investigation. Moreover, the cognitive analysis determines the time required to perform the operations within the application/system and configures the restricted access token a period use limitation based on the time required to perform the operations. As such, embodiments of the present invention insures that the cyber forensic investigation occurs in a manner in which the specialist only has access to application/systems necessary to perform the investigation and is limited to accessing only data and features within those applications/system and performing only those operations required by the investigation.

In specific embodiments of the invention, the details of an identified cyber forensic case are cognitively analyzed to determine parties involved in the investigation and the computing applications/systems applicable to the investigation (i.e., the computer applications/systems that will need to be accessible to the cyber forensic specialist in order to conduct the investigation). Once the applications/systems have been determined, at initial application/system is identified, which serves as the entry point for the investigation. Further cognitive analysis is performed on the details of the cyber forensic and the initial application/system to determine operations that are required to be performed within the initial application/system and, where applicable, the features/sections of the application/system that need to be accessed to perform the identified operations. In addition, cognitive analysis is performed to determine the time required to perform the operations within the application.

Once the cognitive analysis is completed, a restricted access token is generated, and stored in a token database/table, which is specific to the cyber forensic specialist, the case, and the application. The token is configured, such that the cyber forensic specialist, is only granted access to specific data (e.g., specific data associated with parties involved in the investigation) and has rights to perform only certain operations within the application/system. In specific embodiments of the invention, the token is further configured to grant the cyber forensic specialist access to specific features/portions of the application/system in which the operations are to be performed. Moreover, the token is configured to have a predetermined usage period which is based on the determined time required to perform the operations within the application.

Once the initial application/system that has been investigated, iterative processing ensues whereby the details of the case and the evidence logs from previously analyzed applications/systems involved in the case are cognitively analyzed to determine any additional parties involved in the investigation and any additional computing applications/systems applicable to the investigation. In response, a next/subsequent application/system is identified, which serves as the next-in-time point for the investigation. Further cognitive analysis is performed on the details of the cyber forensic, previous evidence logs and the initial application/system to determine operations that are required to be performed within the next/subsequent application/system and, where applicable, the features/sections of the next/subsequent application/system that need to be accessed to perform the identified operations. In addition, cognitive analysis is performed to determine the time required to perform the operations within the next/subsequent application.

In addition, inventive concepts are described which are related to the access authorization process. The cyber forensic specialist, in possession of the token, will present the token, their specialist identifier and the case identifier to request access to the application/system. In response, the details of the token are retrieved and analyzed to determine whether the token has expired and whether the token has remaining usage time. In response to determining that the token has not expired and has remaining usage time, data required to be accessed within the application is identified and a temporary table is generated and populated with the identified data. In this regard, the cyber forensic specialist is granted access to the temporary table as opposed to the entirety of the database.

Referring to FIG. 1, a system 100 for generating and managing restricted access tokens for cyber forensic investigations is presented, in accordance with embodiments of the present invention. The system 100 is implemented in a distributed communication network 102, which may comprise one or more of the Internet, intranet(s), cellular network(s), or the like. The system includes a cyber forensic case 110 that requires investigation by a cyber forensic specialist, otherwise referred to herein as the investigator or user. The cyber forensic case 110 will have been identified by other computing applications, platforms, systems, or the like, not shown in FIG. 1. The cyber forensic case 110 includes data 120 pertaining to the case, which the specialist relies on to pursue their investigation. In specific instances, the cyber forensic case 110 may indicate a likelihood of deceptive actions committed within an enterprise-based network by one or more wrongdoers.

The system 100 additionally includes a first computing apparatus 200, which may be one or more computing devices, such as application server(s) or the like. First computing apparatus 200 includes a first memory 202 and one or more first processing device 204 in communication with first memory 202. First memory 202 stores cognitive analysis platform 210, which is executable by the one or more first processing devices 204. Cognitive analysis platform 210 is configured to receive the data 120 from the cyber forensic case 110 and perform cognitive analysis on the data 120 to determine one or more parties 212 involved in the cyber forensic case 110 and one or typically more computing applications 214 required to be accessed by the cyber forensic specialist to conduct the cyber forensic investigation. Computing applications 214, as used herein, includes computing systems or any other software executing on a computing apparatus that requires authorized access and stores secure data, such as private, confidential, NPI or the like.

Once the computing applications 214 have been determined, cognitive analysis platform 210 is configured to identify the initial computing application 216 from amongst the computing applications 214 that will serve as the entry point for the cyber forensic investigation. Such identification of the initial computing application 216 may be via specialist/user input to the cognitive analysis platform 210 or, alternatively, the cognitive analysis platform 210 may be configured to perform further cognitive analysis to identify the initial computing application 216.

In response to identifying the initial computing application 216, cognitive analysis platform 210 is further configured to perform cognitive analysis on the data 120 pertaining to the cyber forensic case 110 and the initial computing application 216 to determine operations 218 (e.g., read, write, delete, copy and the like) required to be performed within the initial computing application 216 and the overall time required 220 to perform the required operations 218.

First memory 202 additionally stores access token generator platform 230 that is executable by the one or more first processing devices 204. It should be noted that in specific embodiments of the invention, the cognitive analysis platform 210 and the access token generator platform 230 comprise one unified platform/application. As such, discussion herein of two distinct platforms 210, 230 should not be viewed as limiting.

Access token generator platform 230 is configured to receive a case identifier 232 and user (i.e., specialist) identifier 234, along with the one or more parties 212, the one or more operations 218 and the time required 220 to perform the operations 218 from the cognitive analysis platform 210. In response, token generator platform 230 is configured to generate a restricted access token 240 that is specific to (i) the cyber forensic specialist 242, (ii) the cyber forensic case 110, and, in this instance, (iii) the initial computing application 216. Restricted access token 240 grants the assigned cyber forensic specialist 242 (a) access to only the data 244 stored in the initial computing application 216 that is associated with the parties 212 involved in the cyber forensic case 110, (b) rights to perform only the one or more operations 218 on the data 244 in the initial computing application 216, and (c) access to the initial computing application 216 for a first usage period of time 244 that is based on the time required 220 to perform the operations 218. In response to generating the restricted access token, the restricted access token 240 including details (i.e., access rights and the like) is stored in a token database 250 and a token identifier is provided to the cyber forensic specialist/user 242.

In optional embodiments system 100 additionally includes a second computing apparatus 300, which may be one or more computing devices, such as application server(s) or the like. Second computing apparatus 300 includes a second memory 302 and one or more second processing devices 304 in communication with second memory 302. It should be noted that in specific embodiments of the invention, the application access authorization platform 310 may be stored and/or executed within the same computing apparatus as the cognitive analysis platform 210 and access token generator platform 230, obviating the need for a second computing apparatus 300. As such, discussion herein of two distinct computing apparatus 200, 300 should not be viewed as limiting.

Second memory 302 stores application access authorization platform 310 which is configured to manage user access authorization through presentation of the restricted access tokens. Specifically, application access authorization platform 310 is configured to receive a request from the cyber forensic specialist 242 to access the initial computing application 216, the request includes the restricted access token identifier 312, the case identifier 232 and the user identifier 234. In response the application access authorization platform 310, retrieves the restricted access token 240 including the details 244 from the token database 250 and analyzes the details 244 to perform an expiration date verification 314 and a usage time verification 316. Expiration date verification 314 provides for determining whether an expiration date assigned to the restricted access token 240 has been exceeded/passed. Usage time verification 316 provides for determining whether any usage time 244 remains on the restricted access token 240. If expiration date verification 314 determines that the expiration date has passed or the usage time verification 316 determines that no or inconsequential usage time remains, the cyber forensic specialist 242 is denied access to the initial computing application 216.

If expiration date verification 314 determines that the expiration date has not passed and the usage time verification 316 determines that usage time remains, application access authorization platform 310 is further configured to identify the data 244 in the application that pertains to the parties 212 (i.e., the data 244 that the cyber forensic specialist 242 requires access to), generate one or more temporary tables 320 within the application or application's database and populate the temporary table(s) 320 with the data 244. Subsequently, application access authorization platform 310 grants the user/cyber forensic specialist 242 with access only to the temporary tables 320, as opposed to the actual/permanent tables in the application or application's database. Once the user/cyber forensic specialist 242 logs off from the initial computing application 216 or, in other embodiments, once the user/cyber forensic specialist 242 completes the investigation on the initial computing application 216, the temporary table(s) 320 are deleted from the initial computing application 216 and/or associated database.

Referring to FIG. 2, a block diagram is depicted of a first computing apparatus 200 configured for cognitive analysis and generation of restricted access tokens 240 for cyber forensic investigations, in accordance with various alternate embodiments of the invention. First computing apparatus 200, which, as previously discussed, may comprise one or more computing devices (e.g., application server(s), storage servers, or the like), is configured to execute software programs, including platforms, instructions, algorithms, modules, routines, applications, tools and the like. First computing apparatus 200 includes first memory 202 which may comprise volatile and non-volatile memory, such as read-only and/or random-access memory (RAM and ROM), EPROM, EEPROM, flash cards, or any memory common to computing apparatus. Moreover, first memory 202 and the like may comprise cloud storage, such as provided by a cloud storage service and/or a cloud connection service.

Further, first computing apparatus 200 also includes one or more first processing device(s) 204, which may be application-specific integrated circuits ("ASIC"), or other chipset, logic circuit, or other data processing devices configured to execute the platforms 210 and 230. First processing device(s) 204 or the like may execute one or more application programming interface (APIs) 206 that interface with any resident programs, such as cognitive analysis platform 210 and access token generator platform 230 or the like stored in the first memory 202 of the first computing apparatus 200 and any external programs. First processing device(s) 204 may include various processing subsystems (not shown in FIG. 2) embodied in hardware, firmware, software, and combinations thereof, that enable the functionality of computing apparatus 200 and the operability of computing apparatus 200 on distributed communications network 102 (shown in FIG. 1). For example, processing subsystems allow for initiating and maintaining communications and exchanging data with other networked devices, such as second computing apparatus 300 or the like. For the disclosed aspects, processing subsystems of first computing apparatus 200 may include any processing subsystem used in conjunction with cognitive analysis platform 210 and access token generator platform 230 and related engines, tools, routines, sub-routines, algorithms, sub-algorithms, sub-modules thereof.

First computing apparatus 200 additionally includes a communications module (not shown in FIG. 2) embodied in hardware, firmware, software, and combinations thereof, that enables electronic communications between computing apparatus 200 and other network devices. Thus, the communication module may include the requisite hardware, firmware, software and/or combinations thereof for establishing and maintaining a network communication connection with one or more network devices or the like.

As previously discussed in relation to FIG. 1, first memory 202 stores cognitive analysis platform 210, which is executable by the one or more first processing devices 204. Cognitive analysis platform 210 is configured to receive the data 120 from the cyber forensic case 110 and perform cognitive analysis on the data 120 to determine one or more parties 212 involved in the cyber forensic case 110 and one or typically more computing applications 214 required to be accessed by the cyber forensic specialist to conduct the cyber forensic investigation. In subsequent iterations, after the initial computing application 216 or any other required computing application has been investigated, cognitive analysis platform 210 is configured to receive the data 120 from the cyber forensic case 110 and evidence logs 130 from previously investigated computing applications 214 and perform cognitive analysis on the data 120 and evidence logs 130 to determine one or more additional parties 213 involved in the cyber forensic case 110 and one or typically more additional computing applications 215 required to be accessed by the cyber forensic specialist 242 to conduct the cyber forensic investigation. In specific instances the cognitive analysis on the data 120 and evidence logs 130 to determines a revised listing of the parties 212 and computing applications 214, which may include the addition of new parties and/or computing applications and, where applicable the deletion of parties and/or computing applications that are no longer required in the cyber forensic investigation.

As previously discussed, once the computing applications 214 have been determined, cognitive analysis platform 210 is configured to identify the initial computing application 216 from amongst the computing applications 214 that will serve as the entry point for the cyber forensic investigation. In subsequent iterations, once the additional computing applications 215 have been determined, cognitive analysis platform 210 is configured to identify the next computing application 217 from amongst the computing applications 214 and the additional computing applications 215 that will serve as the next point in the cyber forensic investigation. Such identification of the initial computing application 216 may be via specialist/user input to the cognitive analysis platform 210 or, alternatively, the cognitive analysis platform 210 may be configured to perform further cognitive analysis to identify the initial computing application 216.

In response to identifying the initial computing application 216 or a next computing application 217, cognitive analysis platform 210 is further configured to perform cognitive analysis on the data 120 pertaining to the cyber forensic case 110, the initial or next computing application 216, 217 and, in some instances the evidence logs 130 to determine operations 218 (e.g., read, write, delete, copy and the like) required to be performed within the initial computing application 216. In those embodiments in which the computing application 214 has distinct functions 222, otherwise referred to sections or the like, cognitive analysis platform 210 is further configured to perform cognitive analysis on the data 120 pertaining to the cyber forensic case 110, the initial or a next computing application 216, 217 and, in some instances, the evidence logs 130 to determine functions 222 required to be accessed to perform the operations 218 and/or access the data 242 pertaining to the parties 212, 213.

In addition, cognitive analysis platform 210 is further configured to determine an overall time required 220 to perform the required operations 218. In specific embodiments of the invention, cognitive analysis platform 210 is further configured to determine individual times required to perform a specific operation 218 or access a specific function 222.

First memory 202 additionally stores access token generator platform 230 that is executable by the one or more first processing devices 204. Access token generator platform 230 is configured to receive a case identifier 232 and user (i.e., specialist) identifier 234, along with the one or more parties 212, the one or more operations 218, the time required 220 to perform the operations 218 and, in some embodiments, the functions one or more 222 from the cognitive analysis platform 210. In response, token generator platform 230 is configured to generate a restricted access token 240 that is specific to (i) the cyber forensic specialist 242, (ii) the cyber forensic case 110, and, in this instance, (iii) the initial or next computing application 216, 217.

Restricted access token 240 grants the assigned cyber forensic specialist 242 (a) access to only the data 244 stored in the initial or a next computing application 216, 217 that is associated with the parties 212, 213 involved in the cyber forensic case 110, (b) rights to perform only the one or more operations 218 on the data 244 in the initial or a next computing application 216, 217, and (c) access to the initial or next computing application 216, 217 for a first usage period of time 244 that is based on the time required 220 to perform the operations 218. In response to generating the restricted access token, the restricted access token 240 including details (i.e., access rights and the like) is stored in a token database 250 and a token identifier is provided to the cyber forensic specialist/user 242. In specific embodiments of the invention, the restricted access token 240 grants the assigned cyber forensic specialist 242 (d) access to only those functions 222 determined to be required to perform the operations 222 or access the data 244 in the initial or a next computing application 216, 217. In other specific embodiments of the invention, the restricted access token 240 grants the assigned cyber forensic specialist 242 (e) access to specific functions 222 within the initial or next computing application 216, 217 for a second usage period of time that is based on the time required to access the specific function 222 and/or perform specific an operation 218 within a specific function 222.

Referring to FIG. 3, a block diagram is depicted of a second computing apparatus 300 configured for managing user access authorization through presentation of the restricted access tokens, in accordance with various alternate embodiments of the invention. Second computing apparatus 300, which, as previously discussed, may comprise one or more computing devices (e.g., application server(s), storage servers, or the like), is configured to execute software programs, including platforms, instructions, algorithms, modules, routines, applications, tools and the like. Second computing apparatus 300 includes second memory 302 which may comprise volatile and non-volatile memory, such as read-only and/or random-access memory (RAM and ROM), EPROM, EEPROM, flash cards, or any memory common to computing apparatus. Moreover, second memory 302 and the like may comprise cloud storage, such as provided by a cloud storage service and/or a cloud connection service.

Further, second computing apparatus 300 also includes one or more first processing device(s) 304, which may be application-specific integrated circuits ("ASIC"), or other chipset, logic circuit, or other data processing devices configured to execute the application access authorization platform 310. Second processing device(s) 304 or the like may execute one or more application programming interface (APIs) 306 that interface with any resident programs, such as application access authorization platform 310 or the like stored in the second memory 302 of the second computing apparatus 300 and any external programs. Second processing device(s) 304 may include various processing subsystems (not shown in FIG. 3) embodied in hardware, firmware, software, and combinations thereof, that enable the functionality of second computing apparatus 300 and the operability of second computing apparatus 300 on distributed communications network 102 (shown in FIG. 1). For example, processing subsystems allow for initiating and maintaining communications and exchanging data with other networked devices, such first computing apparatus 200 or the like. For the disclosed aspects, processing subsystems of second computing apparatus 300 may include any processing subsystem used in conjunction with application access authorization platform 310 and related engines, tools, routines, sub-routines, algorithms, sub-algorithms, sub-modules thereof.

Second computing apparatus 300 additionally includes a communications module (not shown in FIG. 3) embodied in hardware, firmware, software, and combinations thereof, that enables electronic communications between second computing apparatus 300 and other network devices. Thus, the communication module may include the requisite hardware, firmware, software and/or combinations thereof for establishing and maintaining a network communication connection with one or more network devices or the like.

As previously discussed in relation to FIG. 1, second memory 202 of second computing apparatus 300 stores application access authorization platform 310, which is configured to receive a request from the cyber forensic specialist 242 to access the computing application 216, 217, the request includes the restricted access token identifier 312, the case identifier 232 and the user identifier 234. In response the application access authorization platform 310, retrieves the restricted access token 240 including the details 244 from the token database 250 and analyzes the details 244 to perform an expiration date verification 314 and a usage time verification 316. Expiration date verification 314 provides for determining whether an expiration date 315 assigned to the restricted access token 240 has been exceeded/passed. Usage time verification 316 provides for determining whether any usage time 244 remains on the restricted access token 240. If expiration date verification 314 determines that the expiration date 315 has passed or the usage time verification 316 determines that no or inconsequential usage time 244 remains, the cyber forensic specialist 242 is denied access to the computing application 216, 217.

If expiration date verification 314 determines that the expiration date 315 has not passed and the usage time verification 316 determines that usage time 244 remains, application access authorization platform 310 is further configured to identify the data 244 in the application that pertains to the parties 212 (i.e., the data 244 that the cyber forensic specialist 242 requires access to), and, in some embodiments of the invention, the one or more features 222 of the computing application 26, 217 in which the one or more operations 218 will be performed. In response, the application access authorization platform 310 is further configured to generate one or more temporary tables 320 within the application or application's database and populate the temporary table(s) 320 with the data 244. Subsequently, application access authorization platform 310 grants the user/cyber forensic specialist 242 with access only to the temporary tables 320, as opposed to the actual/permanent tables in the application or application's database. Once the user/cyber forensic specialist 242 logs off from the initial computing application 216 or, in other embodiments, once the user/cyber forensic specialist 242 completes the investigation on the initial computing application 216, the temporary table(s) 320 are deleted from the initial computing application 216 and/or associated database.

Referring to FIG. 4 a flow diagram is depicted of a method 400 for cognitive analysis and generation of a restricted access token for cyber forensic investigation, in accordance with embodiments of the present invention. At Event 410, details of a cyber forensic case are ingested into the cognitive analysis tool/platform. As previously discussed, the cyber forensic case defines one or more events that have occurred in a computing system which have or may have been harmful. The events may have been perpetrated by an internal party, or an external party (e.g., customer, third-party, unauthorized party, or the like). For example, in a financial institution environment, the events have or may have resulted in misappropriation by a nefarious entity.

At Event 420, the case details are cognitively analyzed to determine the one or more parties involved in the cyber forensic case. The parties involved may or may not be parties that have or may have committed the events. Further, at Event 430, the case details are analyzed to determine the computing applications that are required to be analyzed/investigated as part of the cyber forensic investigation. As previously discussed, computing applications may include any software, including computing systems/operating systems that need to be investigated and which may include secure data, such as private, confidential, NPI or the like.

At Event 440, the initial computing application is identified from amongst the determined computing applications. The initial computing application serves as the entry point for initiating the cyber forensic investigation. The initial computing application may be identified manually, such as by the cyber forensic specialist assigned to the case/investigation or the initial computing application may be identified through further cognitive analysis of the case details and the computing applications.

At Event 450, the case details and the initial computing application are cognitively analyzed to determine operations (e.g., read, write, copy, edit, delete or the like) that are required to be performed in the initial computing application as part of the cyber forensic investigation. Further, at Event 460, the case details and the initial computing application are cognitively analyzed to determine a time required to perform the determined operations. The time required may be based historical cyber records investigation records, which collectively indicate the nominal time for performing a specific operation.

At Event 470, a restricted access token is generated that is specific is specific to (i) the cyber forensic specialist, (ii) the cyber forensic case, and, (iii) the initial computing application. Restricted access token grants the assigned cyber forensic specialist (a) access to only the data stored in the initial computing application that is associated with the parties involved in the cyber forensic case, (b) rights to perform only the one or more operations on the data in the initial computing application, and (c) access to the initial computing application for a usage time that is based on the time required to perform the operations. In response to generating the restricted access token, the restricted access token including details (i.e., access rights and the like) is stored in a token database and a token identifier is provided to the cyber forensic specialist/user.

Referring to FIG. 5, a flow diagram is depicted of a method 500 for cognitive analysis and generation of a restricted access token for cyber forensic investigation, in accordance with embodiments of the present invention. Specifically, the method described in relation to FIG. 5 is for generating any restricted access token that is specific to other computing applications other than the initial computing application. At Event 510, details of a cyber forensic case and evidence logs from any previously investigated computing applications (i.e., those which are part of the cyber forensic investigation) are ingested into the cognitive analysis tool/platform.

At Event 520, the case details and the evidence logs are cognitively analyzed to determine the one or more additional parties involved in the cyber forensic case. In specific embodiments, the cognitive analysis determines not just the additional parties but all of the one or more parties including additional parties and the omission of previously determined parties that may no longer be relevant to the investigation. Further, at Event 530, the case details and evidence logs are analyzed to determine additional computing applications that are required to be analyzed/investigated as part of the cyber forensic investigation. In specific embodiments, the cognitive analysis determines not just the additional computing applications but all of the one or more computing applications including additional computing applications and the omission of previously determined computing applications that may no longer be relevant to the investigation.

At Event 540, the next computing application is identified from amongst the determined computing applications. The next computing application serves as the next point for continuing the cyber forensic investigation. The next computing application may be identified manually, such as by the cyber forensic specialist assigned to the case/investigation or the next computing application may be identified through further cognitive analysis of the case details, evidence logs and the computing applications.

At Event 550, the case details, evidence logs and the next computing application are cognitively analyzed to determine operations (e.g., read, write, copy, edit, delete or the like) that are required to be performed in the next computing application as part of the cyber forensic investigation. Further, at Event 660, the case details, evidence logs and the initial computing application are cognitively analyzed to determine a time required to perform the determined operations. The time required may be based historical cyber records investigation records, which collectively indicate the nominal time for performing a specific operation.

At Event 570, a restricted access token is generated that is specific is specific to (i) the cyber forensic specialist, (ii) the cyber forensic case, and, (iii) the next computing application. Restricted access token grants the assigned cyber forensic specialist (a) access to only the data stored in the initial computing application that is associated with the parties involved in the cyber forensic case, (b) rights to perform only the one or more operations on the data in the next computing application, and (c) access to the next computing application for a usage time that is based on the time required to perform the operations. In response to generating the restricted access token, the restricted access token including details (i.e., access rights and the like) is stored in a token database and a token identifier is provided to the cyber forensic specialist/user.

At Event 580, the cyber forensic investigation of the next application ensues and, upon completion or during the investigation thereof, the process returns to Event 510, at which the next computing application is identified and restricted access token specific to the next computing application is generated. This process occurs iteratively until of the computing applications required for conducting the cyber forensic investigation have a corresponding restricted access token generated.

Referring to FIG. 6, a flow diagram is depicted of a method 500 for managing access to computing application for cyber forensic investigations through use of restricted access tokens, in accordance with embodiments of the present invention. At event 610, user inputs to a computing application are received that include a token identifier, a case identifier, and a specialist identifier. In response, at Event 620, a token database is accessed and the details pertaining to the restricted access token corresponding to the token identifier are retrieved for subsequent analysis.

At Decision 630, a determination is made as to whether the token has expired (i.e., whether the expiration data assigned to the restricted access token has been exceed/passed). If determination results in the token having expired, at Event 640, the user/cyber forensic specialist is denied access to the computing application. At Decision 650, a determination is made as to whether the token has usage time remaining. If determination results in the token having no remaining usage time, at Event 650, the user/cyber forensic specialist is denied access to the computing application.

If the determination at Decisions 630 and 640 result in token having not expired and usage time remaining, at Event 670, data and, in some instances, features required to be accessed in the computing application are identified. In response to the data identification, temporary table(s) are generated within the application or the application's database that are populated with the identified data. At Event 690, the user/cyber forensic specialist is granted access only to the temporary tables as opposed to the entire database/corpus of data.

Referring to FIG. 7, a flow diagram is depicted of a method 700 for generating a restricted access token for cyber forensic investigation, in accordance with embodiments of the present invention. At Event 710, data pertaining to a cyber forensic case are cognitively analyzed to determine (i) parties associated with the cyber forensic case, and (ii) computing applications/systems required to be accessed to perform the investigation. In specific embodiments of the method, in which investigation of the computing applications for the case has already begun, the cognitive analysis may further include the evidence logs resulting from such investigations and additional parties and/or computing applications may be determined.

At Event 720, in response to identifying an initial computing application from amongst the determined computing applications, which defines an entry point for beginning the investigation, the data pertaining to the cyber forensic case and the initial computing application are cognitively analyzed to determine operations required to be performed in the initial computing application and the time required to perform such operations. In specific embodiments of the method, in which the investigation of the computing applications for the case has already begun, a next/subsequent computing application is identified and, in response, the data pertaining to the cyber forensic case, the evidence logs and the next/subsequent computing application are cognitively analyzed to determine operations required to be performed in the next/subsequent computing application and the time required to perform such operations.

At Event 730, a restricted access token is generated, and stored in a token database, that is specific to the assigned cyber forensic specialist, the cyber forensic case, and the computing application. The restricted access token grants the assigned cyber forensic specialist (a) access to only data in the initial computing application associated with the one or more parties, (b) rights to perform only the one or more operations in the initial computing application, and (c) access to the initial computing application for a usage time that is based on the time required to perform the operations. In further specific embodiments of the method, the restricted access token is further configured to grant the cyber forensic specialist access to only specific features (i.e., portions/sections) of the application in which the operations are to be performed.

Thus, present embodiments of the invention provide systems, methods, computer program products and/or the like for cognitively determining (i) parties and applications pertaining to cyber forensic case and (ii) operations required within an identified application and a time required to perform the operations to subsequently generate a restricted access token. The restricted access token is specific to the application/system, a specialist, and the case and provides for limited access to only the data, features, and operations necessary to perform the investigation. Moreover, the cognitive analysis determines the time required to perform the operations within the application/system and configures the restricted access token a period use limitation based on the time required to perform the operations. As such, embodiments of the present invention insures that the cyber forensic investigation occurs in a manner in which the specialist only has access to application/systems necessary to perform the investigation and is limited to accessing only data and features within those applications/system and performing only those operations required by the investigation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing cognitive restricted access tokens for cyber forensic investigation, the system comprising:
   a cyber forensic case requiring investigation by an assigned cyber forensic specialist, wherein the cyber forensic case includes data pertaining to the cyber forensic case;
   a first computing apparatus including a first memory and one or more first computing processor devices in communication with the first memory, wherein the first memory stores (i) a cognitive analysis platform, and (ii) an access token generator platform that are executable by the one or more first computing processing devices,
   wherein the cognitive analysis platform is configured to:
      cognitively analyze the data pertaining to the cyber forensic case to determine (i) one or more parties associated with the cyber forensic case, and (ii) one or more computing applications required to be accessed to perform the investigation,
      in response to identifying an initial computing application from amongst the one or more computing applications that defines an entry point for beginning the investigation, cognitively analyze the data pertaining to the cyber forensic case and the initial computing application to determine (i) one or more operations required to be performed within the initial computing application during the investigation, and (ii) a time required to perform the one or more operations, and
   wherein the access token generator platform is configured to:
      receive (i) a case identifier associated with the cyber forensic case, (ii) a user identifier associated with the assigned cyber forensic specialist, (iii) the one or more parties, (iv) the one or more operations need to be performed during the investigation, and (v) the time required to perform the one or more operations; and
      generate, and store in a token database, a restricted access token that is specific to (i) the assigned cyber forensic specialist, (ii) the cyber forensic case, and (iii) the initial computing application, wherein the restricted access token grants the assigned cyber forensic specialist (a) access to only data in the initial computing application associated with the one or more parties, (b) rights to perform only the one or more operations in the initial computing application, and (c) access to the initial computing application for a first usage time that is based on the time required to perform the operations.

2. The system of claim 1, wherein the access token generator platform is further configured to generate the restricted access token that further grants the assigned cyber forensic specialist (d) access to only those features within the initial computing application that are associated with the one or more operations.

3. The system of claim 2, wherein the access token generator platform is further configured to generate the restricted access token that further grants the assigned cyber forensic specialist (e) access to each of the features for a corresponding second usage time, wherein the second usage time is based on the time required to perform one or more associated operations within the corresponding feature.

4. The system of claim 1, wherein the access token generator platform is further configured to generate the restricted access token that further grants the assigned cyber forensic specialist (d) access to the initial computing application until an occurrence of an expiration date.

5. The system of claim 1, wherein the cognitive analysis platform is further configured to:
   in response to completing investigation within the initial computing application or any subsequent computing application, cognitively analyze the data pertaining to the cyber forensic case and evidence logs associated with previously investigated computing applications to determine whether at least one of (i) one or more additional parties are associated with the cyber forensic case, or (ii) one or more additional computing applications need to be accessed to perform the investigation.

6. The system of claim 5, wherein the cognitive analysis platform is further configured to:
   in response to identifying a next computing application for forensic investigation from amongst (i) the one or more computing applications, or (ii) the one or more computing applications and the one or more additional computing applications, cognitively analyze the data pertaining to the cyber forensic case, the evidence logs associated with previously investigated computing applications, and the next computing application to determine (i) one or more operations required to be performed within the next computing application during the investigation, and (ii) a time required to perform the one or more operations.

7. The system of claim 6, wherein the access token generator platform is further configured to generate a subsequent restricted access token that is specific to (i) the assigned cyber forensic specialist, (ii) the cyber forensic case, and (iii) the next computing application, wherein the subsequent restricted access token grants the assigned cyber forensic specialist (a) access to only data in the next computing application associated with the one or more parties, or the one or more parties and the one or more additional parties, (b) rights to perform only the one or more operations in the next computing application, and (c) access to the next computing application for a first usage time that is based on the time required to perform the operations.

8. The system of claim 1, further comprising:
   a second computing apparatus including a second memory and one or more second computing processor devices in communication with the second memory, wherein the second memory stores an application access authorization platform that is executable by the one or more second computing processing devices and configured to:
      receive user input of the restricted access token, a user identifier, and a cyber forensic case identifier at the initial application,
      access the token database to retrieve details of the restricted access token, determine from the details whether access can be provided to the user based on the usage time, in response to determining that access can be provided based on the usage time remaining, identify the data in the initial computing application associated with the one or more parties, generate a temporary table in the database that contains only the data in the initial computing application associated with the one or more parties, and grant the user access only to the temporary table to perform the one or more operations on the data in the temporary table.

9. The system of claim 8, wherein the application access authorization platform is further configured to delete the temporary table in response to the user exiting the initial application.

10. The system of claim 8, wherein the application access authorization platform is further configured to:

determine whether access can be provided to the user based on an expiration date assigned to the restricted access token, and wherein the application access authorization platform is configured to identify the data in response to determining that access can be provided based on (i) the usage time remaining, and (ii) the expiration date having not occurred.

11. A computer-implemented method for managing cognitive restricted access tokens for cyber forensic investigation, the method executed by one or more computing processor device and comprising:

cognitively analyzing data pertaining to a cyber forensic case to determine (i) one or more parties associated with the cyber forensic case, and (ii) one or more computing applications required to be accessed to perform the investigation;

in response to identifying an initial computing application from amongst the one or more computing applications that defines an entry point for beginning the investigation, cognitively analyzing the data pertaining to the cyber forensic case and the initial computing application to determine (i) one or more operations required to be performed within the initial computing application during the investigation, and (ii) a time required to perform the one or more operations; and generating, and storing in a token database, a restricted access token that is specific to (i) an assigned cyber forensic specialist, (ii) the cyber forensic case, and (iii) the initial computing application, wherein the restricted access token grants the assigned cyber forensic specialist (a) access to only data in the initial computing application associated with the one or more parties, (b) rights to perform only the one or more operations in the initial computing application, and (c) access to the initial computing application for a first usage time that is based on the time required to perform the operations.

12. The computer-implemented method of claim 11, wherein generating the restricted access token further comprising generating the restricted access token that further grants the assigned cyber forensic specialist (d) access to only those features within the initial computing application that are associated with the one or more operations.

13. The computer-implemented method of claim 11 wherein generating the restricted access token further comprising generating the restricted access token that further grants the assigned cyber forensic specialist (d) access to the initial computing application until an occurrence of an expiration date.

14. The computer-implemented method of claim 11, further comprising:

in response to completing investigation within the initial computing application, cognitively analyzing the data pertaining to the cyber forensic case and evidence logs associated with previously investigated initial computing application to determine whether at least one of (i) one or more additional parties are associated with the cyber forensic case, or (ii) one or more additional computing applications need to be accessed to perform the investigation;

in response to identifying a next computing application for forensic investigation from amongst (i) the one or more computing applications, or (ii) the one or more computing applications and the one or more additional computing applications, cognitively analyzing the data pertaining to the cyber forensic case, the evidence logs associated with previously investigated initial computing application, and the next computing application to determine (i) one or more operations required to be performed within the next computing application during the investigation, and (ii) a time required to perform the one or more operations; and generating a subsequent restricted access token that is specific to (i) the assigned cyber forensic specialist, (ii) the cyber forensic case, and (iii) the next computing application, wherein the subsequent restricted access token grants the assigned cyber forensic specialist (a) access to only data in the next computing application associated with the one or more parties, or the one or more parties and the one or more additional parties, (b) rights to perform only the one or more operations in the next computing application, and (c) access to the next computing application for a first usage time that is based on the time required to perform the operations.

15. The computer-implemented method of claim 11, further comprising:

receiving user input requesting access to the initial computing application and includes, the restricted access token, a user identifier, and a cyber forensic case identifier;

accessing the token database to retrieve details of the restricted access token;

determining, from the details, whether access can be provided to the user based on the usage time:

in response to determining that access can be provided based on the usage time remaining, identifying the data in the initial computing application associated with the one or more parties;

generating a temporary table in the database that contains only the data in the initial computing application associated with the one or more parties; and granting the user access to only the temporary table to perform the one or more operations on the data in the temporary table.

16. A computer program product comprising:

a non-transitory computer-readable medium comprising:

a first set of codes for causing a computer to cognitively analyze data pertaining to a cyber forensic case to determine (i) one or more parties associated with the cyber forensic case, and (ii) one or more computing applications required to be accessed to perform the investigation;

a second set of codes for causing a computer to, in response to identifying an initial computing application from amongst the one or more computing applications that defines an entry point for beginning the investigation, cognitively analyze the data pertaining to the cyber forensic case and the initial computing application to determine (i) one or more operations required to be performed within the initial computing application during the investigation, and (ii) a time required to perform the one or more operations; and a third set of codes for causing a computer to generate, and store in a token database, a restricted access token that is specific to (i) an assigned cyber forensic specialist, (ii) the cyber forensic case, and (iii) the initial computing application, wherein the restricted access token grants the assigned cyber forensic specialist (a) access to only data in the initial computing application associated with the one or more parties, (b) rights to perform only the one or more operations in the initial computing application, and (c) access to the initial computing application for a first usage time that is based on the time required to perform the operations.

17. The computer program product of claim 16, wherein the third set of codes are further configured to cause the computer to generate the restricted access token that further grants the assigned cyber forensic specialist (d) access to only those features within the initial computing application that are associated with the one or more operations.

18. The computer program product of claim 16, wherein the third set of codes are further configured to cause the computer to generate the restricted access token that further grants the assigned cyber forensic specialist (d) access to the initial computing application until an occurrence of an expiration date.

19. The computer program product of claim 16, wherein the first set of codes are further configured to cause the computer to, in response to completing investigation within the initial computing application, cognitively analyze the data pertaining to the cyber forensic case and evidence logs associated with previously investigated initial computing application to determine whether at least one of (i) one or more additional parties are associated with the cyber forensic case, or (ii) one or more additional computing applications need to be accessed to perform the investigation, wherein the second set of codes are further configured to cause the computer to, in response to identifying a next computing application from amongst wherein the second set of codes are further configured to cause the computer to, in response to identifying a next computing application for forensic investigation from amongst (i) the one or more computing applications, or (ii) the one or more computing applications and the one or more additional computing applications, cognitively analyze the data pertaining to the cyber forensic case, the evidence logs associated with previously investigated initial computing application, and the next computing application to determine (i) one or more operations required to be performed within the next computing application during the investigation, and (ii) a time required to perform the one or more operations, and wherein the third set of codes are further configured to cause the computer to generate a subsequent restricted access token that is specific to (i) the assigned cyber forensic specialist, (ii) the cyber forensic case, and (iii) the next computing application, wherein the subsequent restricted access token grants the assigned cyber forensic specialist (a) access to only data in the next computing application associated with the one or more parties, or the one or more parties and the one or more additional parties, (b) rights to perform only the one or more operations in the next computing application, and (c) access to the next computing application for a first usage time that is based on the time required to perform the operations.

20. The computer program product of claim 16, further comprising:

a fourth set of codes for causing a computer to (i) receive user input requesting access to the initial computing application and includes the restricted access token, a user identifier and a cyber forensic case identifier and (ii) access the token database to retrieve details of the restricted access token;

a fifth set of codes for causing a computer to determine, from the details, whether access can be provided to the user based on the usage time, and, in response to determining that access can be provided based on the usage time remaining, identify the data in the initial computing application associated with the one or more parties;

a sixth set of codes for causing a computer to generate a temporary table in the database that contains only the data in the initial computing application associated with the one or more parties, and grant the user access to only the temporary table to perform the one or more operations on the data in the temporary table.

\* \* \* \* \*